United States Patent
Kolton et al.

(10) Patent No.: US 6,518,888 B1
(45) Date of Patent: Feb. 11, 2003

(54) ELECTRONIC ARTICLE SURVEILLANCE MARKER ASSEMBLY

(75) Inventors: Chester Kolton, Westfield, NJ (US); Michael Norman, East Brunswick, NJ (US); Robert Whittemore, Middletown, NY (US)

(73) Assignee: B&G Plastic, Inc., Newark, NJ (US)

( * ) Notice: Subject to any disclaimer, the term of this patent is extended or adjusted under 35 U.S.C. 154(b) by 0 days.

(21) Appl. No.: 09/953,787

(22) Filed: Sep. 17, 2001

(51) Int. Cl.⁷ ............................................... G08B 13/14
(52) U.S. Cl. ............................... 340/572.8; 340/572.1; 340/575; 340/572.6; 40/229.01; 40/316; 24/3.3; 24/3.12
(58) Field of Search .................... 340/572.1, 572.8, 340/568.1, 572.6, 572.7, 571, 575, 576; 40/229.01, 316; 70/57.1; 24/3.3, 3.12

(56) References Cited

U.S. PATENT DOCUMENTS

| | | | | |
|---|---|---|---|---|
| 4,130,317 A | * | 12/1978 | Lai | 248/229 |
| 5,079,540 A | * | 1/1992 | Narlow et al. | 340/572.1 |
| 5,945,909 A | | 8/1999 | Kolton | 340/572.1 |
| 6,188,320 B1 | * | 2/2001 | Kolton et al. | 340/572.9 |
| 6,263,546 B1 | * | 7/2001 | Baldwin et al. | 24/3.3 |
| 6,302,538 B1 | * | 10/2001 | Friedman | 351/48 |
| 6,330,758 B1 | * | 12/2001 | Feibelman | 40/299.01 |

* cited by examiner

Primary Examiner—Jeffery Hofsass
Assistant Examiner—Daniel Previl
(74) Attorney, Agent, or Firm—Robin, Blecker & Daley

(57) ABSTRACT

An EAS marker assembly includes a housing defining an interior compartment and at least one channel accessible exteriorly of the housing and extending therethrough, an EAS marker contained in the compartment, and at least one securement member having a body portion and first and second leg portions depending from the body portion configured to be jointly insertable in the channel, the body portion and the leg portions defining a cavity closed at one end by the body portion and open at free ends of the leg portions. A combination includes: eyeglasses having a lens holder and first and second temples pivotally secured to the lens holder, at least one clip having a body portion and leg portions depending from the body portion, the body portion defining a cavity, the first temple being resident in the cavity, a housing defining an interior compartment and at least one channel accessible exteriorly of the housing and extending therethrough, the leg portions of the clip being retentively resident in the channel and an EAS member disposed in the compartment.

23 Claims, 2 Drawing Sheets

ELECTRONIC ARTICLE SURVEILLANCE MARKER ASSEMBLY

FIELD OF THE INVENTION

This invention relates generally to shoplifting prevention and pertains more particularly to electronic article surveillance (EAS) marker assemblies for use with eyeglasses and other products.

BACKGROUND OF THE INVENTION

Commonly-assigned U.S. Pat. No. 5,945,909 discloses a so-called "seal" comprising a one-piece body having first and second members closable one upon the other and thereupon respectively defining first and second outer seal walls and a tail peripherally continuous with at least one of the first and second members at a third outer seal wall, the tail having a hook at a free end thereof. The seal body defines an interior recess and a detent opening into said third outer seal wall for retentive reception of the tail hook interiorly of said seal. An EAS marker is disposed in the seal body recess and is contained therein between the first and second outer seal walls upon closure of the first and second members.

The '909 patent seal is used by circumscribing a portion of an article, e.g., a watchband, with the tail and then inserting the tail hook into seal body detent.

The EAS marker is a flat ferromagnetic strip member and is detectable by various known EAS systems, e.g., where the marker is not deactivated (as at an article payment checkout counter) and is carried through EAS marker detection gates at a facility exit.

SUMMARY OF THE INVENTION

The present invention has as its primary object the provision of improved EAS marker assemblies.

A more particular object of the invention is to provide an EAS marker assembly for eyeglasses and other articles.

In attaining these and other objects, the invention provides an EAS marker assembly comprising a housing defining an interior compartment and at least one channel accessible exteriorly of the housing and extending therethrough, an EAS marker contained in the compartment, and at least one securement member having a body portion and first and second leg portions depending from the body portion configured to be jointly insertable in the channel, the body portion and the leg portions defining a cavity closed at one end by the body portion and open at free ends of the leg portions.

The channel and the leg portions includes respective securement structures providing for retention of the leg portions in the channel upon insertion of the leg portions in the channel.

The invention provides, in combination: eyeglasses having a lens holder and first and second temples pivotally secured to the lens holder, at least one clip having a body portion and leg portions depending from the body portion, the body portion defining a cavity, the first temple being resident in the cavity, a housing defining an interior compartment and at least one channel accessible exteriorly of the housing and extending therethrough; the leg portions of the clip being retentively resident in the channel; and an EAS member disposed in the compartment.

In a preferred embodiment of such combination, a second clip is used and it engagingly circumscribes the first temple at a location spaced from the first-mentioned clip. The housing defines a second channel and the leg portions of the second clip are retentively resident in the second channel.

The invention will be further understood from consideration of the following description of preferred embodiments thereof and from the drawings where like reference numerals identify like parts throughout.

DETAILED DESCRIPTION OF PREFERRED EMBODIMENTS AND PRACTICES

Figure 1:
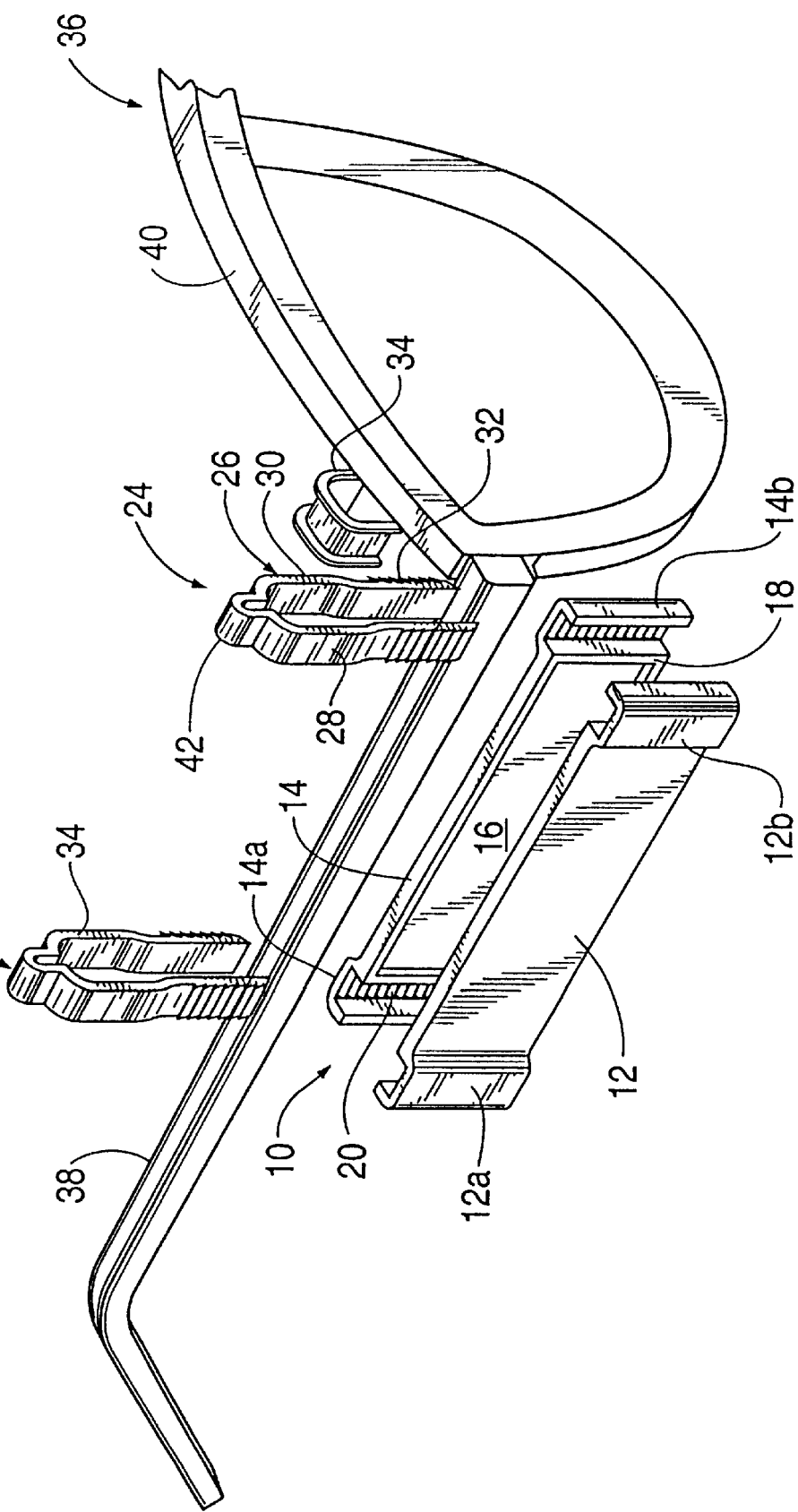
FIG. 1 is an exploded perspective view of components constituting a first embodiment of the invention.

Referring to FIG. 1, EAS marker assembly 10 comprises a housing preferably having two housing members 12 and 14, which are ultrasonically welded to one another following insertion of EAS marker 16 in housing interior compartment 18, shown formed in housing member 14.

Housing members 12 and 14 have at least one and preferably two channels accessible exteriorly of the housing and extending therethrough. In the illustrated embodiment, one channel is formed by facing housing member end portions 12a and 14a and another channel is formed by facing housing member end portions 12b and 14b. Ratchet teeth 20 are formed interiorly in each of hosing member end portions 12a, 12b, 14a and 14b.

At least one and preferably two clips 22 and 24 are provided, identically constructed. Clip 24 has body portion 26 and leg portions 28 and 30 depending from body portion 26 and configured to be jointly insertable in the channel formed by housing member end portions 14a and 14b.

Body portion 26 and leg portions 28 and 30 define a cavity closed at one end by body portion 26 and open at free ends of leg portions 28 and 30. Ratchet teeth 32 are formed on exterior surfaces of leg portions 28 and 30 and mesh with ratchet teeth 20 formed in housing end portions 12b and 14b upon insertion of leg portions 28 and 30 in the channel defined by housing end portions 12b and 14b.

Resilient insert 34 is insertable into the cavity portion bounded by body portion 26, for purposes discussed below.

Eyeglasses 36 include temples, one being shown and indicated at 38, and a bridge or lens holder 40.

In assembling EAS marker assembly 10 with eyeglasses 36, clips 22 and 24 are disposed to straddle temple 38 and the clips are then forced onto temple 38, such that temple 38 resides in the cavities formed by the body portions of clips 22 and 24, temple 38 then being protected by resilient insert 34 from scratching or like marking of its appearance. The leg portions of clips 22 and 24 are now inserted into the respective housing channels and forced into the housing channels until the upper part of the housing firmly abuts the undersurface of temple 38. Ratchet teeth 20 and 32 are configured to permit only unidirectional movement of the clip leg portions in the respective housing channels, whereby, once inserted as above discussed, the leg portions are retentively resident in the housing channels.

Each of clips 22 and 24 is provided with an uppermost body portion, shown at 42 for clip 24, which may be cut off at a checkout counter, whereby the remaining upper body portions of the dips may be separated from one another, the resilient member may be removed and the temple may be separated from the remnant of the EAS marker assembly.

Figure 2:
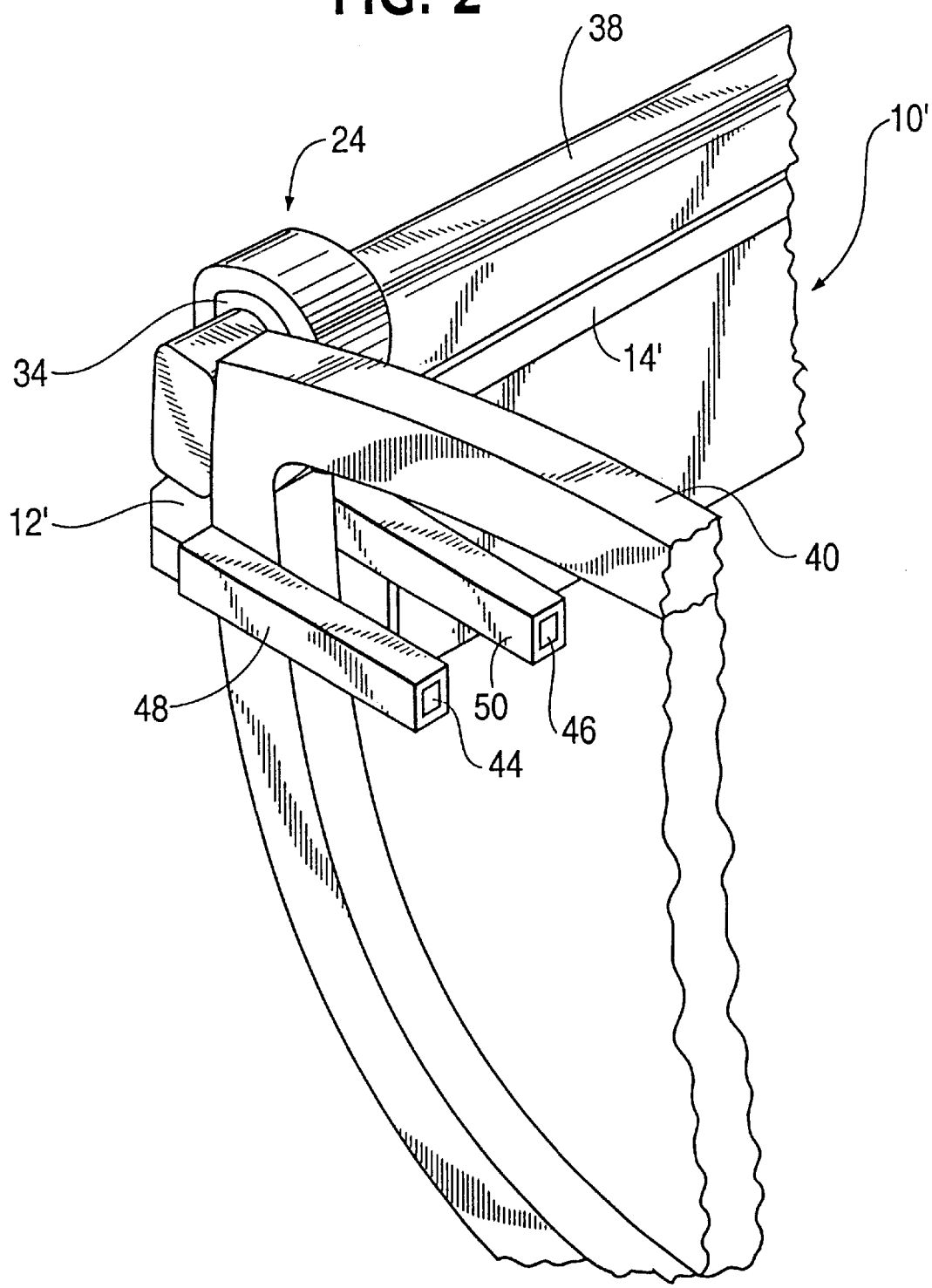
FIG. 2 is a perspective view of a second embodiment of the invention.

Turning to FIG. 2, EAS marker assembly 10' is identical to EAS marker assembly 10, except for the assembly including members 44 and 46 formed integrally with respective housing members 12' and 14' and projecting in a direction transversely to the housing channels. Resilient sleeves 48 and 50, which as in the case of resilient insert 34, may be comprised or rubber or the like, encircle members 44 and 46, respectively.

Projecting members 44 and 46 provide EAS marker assembly with a further capacity, i.e., preventing temple 38 from being folded onto bridge 40. Thus, the temple to which the EAS marker assembly is secured cannot be folded onto the lens holder. This prevents a shoplifter from folding the eyeglasses and placing them in a jacket pocket. Still further, the projecting members prevent a shoplifter from sliding the EAS assembly off the temple and are used where temples are of such shape as to permit sliding the EAS assembly therefrom.

As will be seen from the foregoing, the invention provides an EAS marker assembly comprising a housing defining an interior compartment and at least one channel accessible exteriorly of the housing and extending therethrough, an EAS marker contained in the compartment, and a securement member having a body portion and first and second leg portions depending from the body portion configured to be jointly insertable in the channel, the body portion and the leg portions defining a cavity closed at one end by the body portion and open at free ends of the leg portions.

The channel and the leg portions includes respective securement structures providing for retention of the leg portions in the channel upon insertion of the leg portions in the channel.

The securement structures comprise respective intermeshing ratchet teeth disposed respectively on an interior surface of the channel and on exterior surfaces of the leg portions.

The EAS marker assembly may further include a resilient member disposed in the cavity one end.

The housing may further define first and second mutually spaced arms extending outwardly of the housing transversely to a direction of the channel and resilient sleeve members disposed respectively on the first and second mutually spaced arms.

As in the illustrated, preferred embodiments, an EAS marker assembly comprises a housing defining an interior compartment and first and second mutually spaced channels accessible exteriorly of the housing and extending therethrough, an EAS marker contained in the compartment, and first and second securement members, each having a body portion and first and second leg portions depending from the body portion configured to be jointly insertable in separate ones of the channels, the body portion and the leg portions of each of the first and second securement members defining a cavity closed at one end by the body portion and open at free ends of the leg portions.

The invention provides, in combination: eyeglasses having a lens holder and first and second temples pivotally secured to the lens holder; at least one clip having a body portion and leg portions depending from the body portion, the body portion defining a cavity, the first temple being resident in the cavity, a housing defining an interior compartment and at least one channel accessible exteriorly of the housing and extending therethrough, the leg portions of the clip being retentively resident in the channel; and an EAS member disposed in the compartment.

Various changes to the particularly depicted embodiments of the invention may be introduced without departing from the scope of the invention. Accordingly, it is to be appreciated that the particularly disclosed embodiments are intended in an illustrative, and not in a limiting, sense. The true spirit and scope of the invention is set forth in the ensuing claims.

What is claimed is:

1. An EAS marker assembly comprising a housing defining an interior compartment and at least one channel accessible exteriorly of the housing and extending therethrough, and EAS marker contained in said compartment, and a securement member having a body portion and first and second leg portions depending from said body portion configured to be jointly insertable in said channel, said body portion and said leg portions defining a cavity closed at one end by said body portion and open at free ends of said leg portions.

2. The EAS marker assembly claimed in claim 1, wherein said channel and said leg portions includes respective securement structures providing for retention of said leg portions in said channel upon insertion of said leg portions in said channel.

3. The EAS marker assembly claimed in claim 2, wherein said securement structures comprise respective intermeshing ratchet teeth disposed respectively on an interior surface of said channel and on exterior surfaces of said leg portions.

4. The EAS marker assembly claimed in claim 1, further including a resilient member disposed in said cavity one end.

5. The EAS marker assembly claimed in claim 1, wherein said housing further defines first and second mutually spaced arms extending outwardly of said housing transversely to a direction of said channel.

6. The EAS marker assembly claimed in claim 5, further including first and second resilient sleeve members disposed respectively on said first and second mutually spaced arms.

7. In combination:
    (a) the EAS marker assembly claimed in claim 1; and
    (b) eyeglasses,
        wherein a temple of said eyeglasses is resident in said cavity.

8. The EAS marker assembly claimed in claim 7, further including a resilient member disposed in each said cavity one end.

9. The EAS marker assembly claimed in claim 8, further including first and second resilient sleeve members disposed respectively on said first and second mutually spaced arms.

10. The EAS marker assembly claimed in claim 7, wherein said housing further defines first and second mutually spaced arms extending outwardly of said housing transversely to a direction of said channel.

11. In combination:
    (a) the EAS marker assembly claimed in claim 7; and
    (b) eyeglasses,
        wherein a temple of said eyeglasses is resident in each said cavity.

12. The invention claimed in claim 11, wherein said channel and said leg portions includes respective securement structures providing for such retentive resident of said leg portions in said channel.

13. The invention claimed in claim 11, further including a resilient member disposed in said cavity and engaging an upper part of said first temple.

14. The invention claimed in claim 11, wherein said housing further defines first and second mutually spaced arms extending outwardly of said housing transversely to a direction of said channel, said lens holder being in part situated between said first and second arms.

15. The invention claimed in claim 11, including a second clip having a body portion and leg portions depending from said body portion, said body portion defining a cavity, said first temple being resident also in said cavity of said body portion of said second clip, said housing defining a second channel, accessible exteriorly of the housing and extending therethrough, said leg portions of said second clip being retentively resident in said second channel.

16. An EAS marker assembly comprising a housing defining an interior compartment and first and second mutually spaced channels accessible exteriorly of the housing and extending therethrough, an EAS marker contained in said compartment, and first and second securement members, each having a body portion and first and second leg portions depending from said body portion configured to be jointly insertable in separate ones of said channels, said body portion and said leg portions of each of said first and second securement members defining a cavity closed at one end by said body portion and open at free ends of said leg portions.

17. The EAS marker assembly claimed in claim 16, wherein each of said first and channels and each of said leg portions of said first and second securement members include respective securement structures providing for retention of said leg portions in said channels upon insertion of said leg portions in said channels.

18. The EAS marker assembly claimed in claim 16, wherein each of said first and second securement structures comprises respective intermeshing ratchet teeth disposed respectively on an interior surface of each of said first and second channels and on exterior surfaces of said leg portions.

19. The invention claimed in claim 13, further including first and second resilient sleeve members disposed respectively on said first and second mutually spaced aims.

20. In combination:
(a) eyeglasses having a lens holder and first and second temples pivotally secured to said lens holder;
(b) at least one clip having a body portion and leg portions depending from said body portion, said body portion defining a cavity, said first temple being resident in said cavity,
(c) a housing defining an interior compartment and at least one channel accessible exteriorly of the housing and extending therethrough, said leg portions of said clip being retentively resident in said channel; and
(d) an EAS member disposed in said compartment.

21. The invention claimed in claim 20, wherein said securement structures comprise respective intermeshing ratchet teeth disposed respectively on an interior surface of said channel and on exterior surfaces of said leg portions.

22. In combination:
(a) eyeglasses having a lens holder and first and second temples pivotally secured to said lens holder,
(b) at least one clip having a body portion and leg portions depending from said body portion, said body portion defining a cavity, said first temple being resident in said cavity;
(c) a housing defining an interior compartment and at least one channel accessible exteriorly of the housing and extending therethrough, said leg portions of said clip being retentively resident in said channel; and
(d) an EAS member disposed in said compartment,
    said housing including means for preventing sliding movement as between said housing and said first temple.

23. In combination:
(a) eyeglasses having a lens holder and first and second temples pivotally secured to said lens holder,
(b) at least one clip having a body portion and leg portions depending from said body portion, said body portion defining a cavity, said first temple being resident in said cavity,
(c) a housing defining an interior compartment and at least one channel accessible exteriorly of the housing and extending therethrough, said leg portions of said clip being retentively resident in said channel; and
(d) an EAS member disposed in said compartment,
    said housing including means for preventing folding of said first temple onto said lens holder.

\* \* \* \* \*

UNITED STATES PATENT AND TRADEMARK OFFICE
CERTIFICATE OF CORRECTION

PATENT NO. : 6,518,888 B1 Page 1 of 1
DATED : February 11, 2003
INVENTOR(S) : Chester Kolton et al.

It is certified that error appears in the above-identified patent and that said Letters Patent is hereby corrected as shown below:

<u>Title page,</u>
Item [57], ABSTRACT,
Line 10, before "A combination includes:" insert a new paragraph.

<u>Column 5,</u>
Line 33, delete "aims" and insert -- arms --.

Signed and Sealed this

Twenty-fifth Day of November, 2003

JAMES E. ROGAN
*Director of the United States Patent and Trademark Office*